Jan. 23, 1968 — E. Y. J. M. GIRE — 3,365,165
VALVE DEVICES
Filed June 16, 1964 — 5 Sheets-Sheet 1
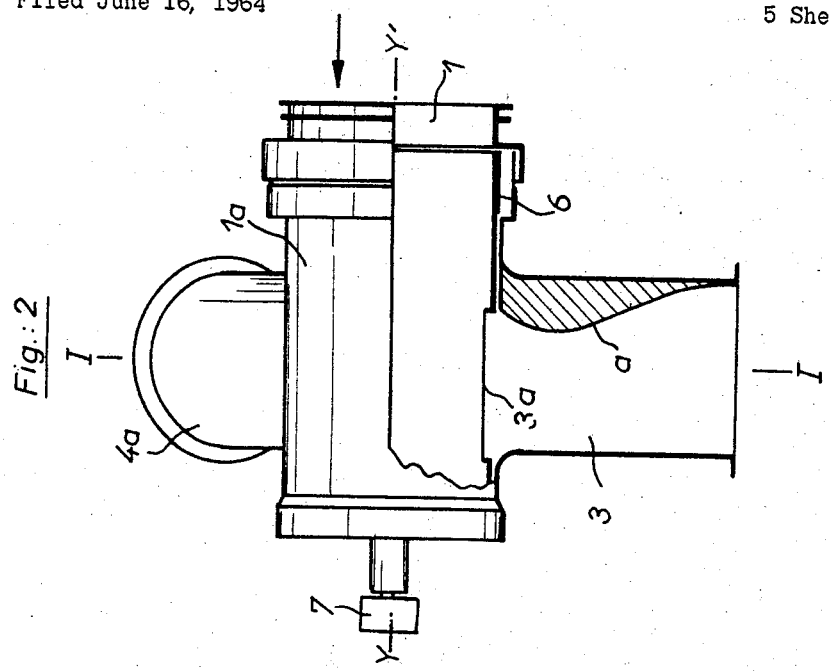
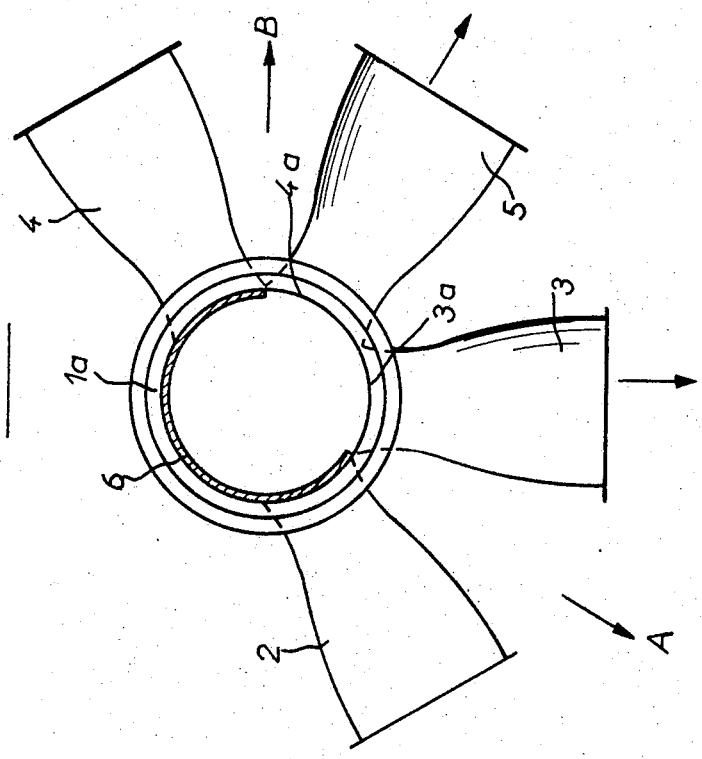
INVENTOR
Etienne Y. J-M. Gire
By Watson, Cole, Grindle & Watson
ATTORNEYS Jan. 23, 1968  E. Y. J. M. GIRE  3,365,165
VALVE DEVICES
Filed June 16, 1964  5 Sheets-Sheet 2
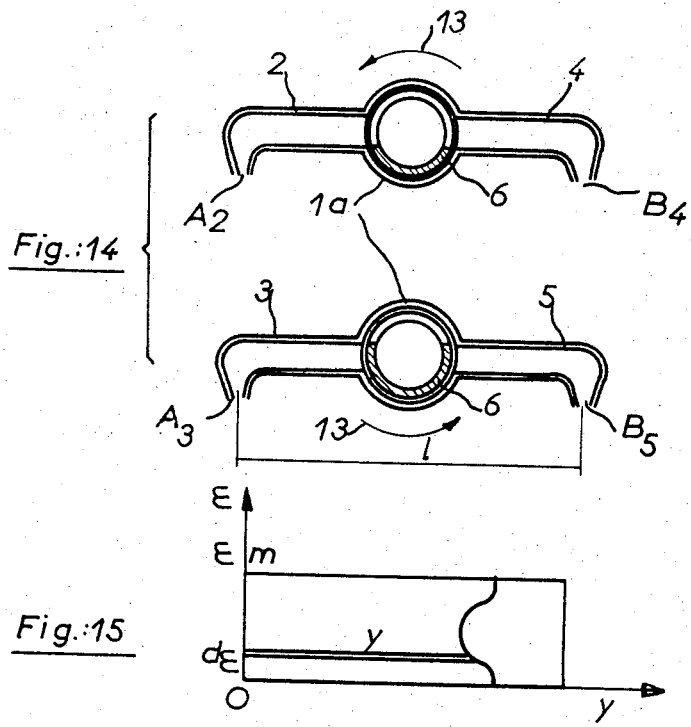
Fig.:14
Fig.:15
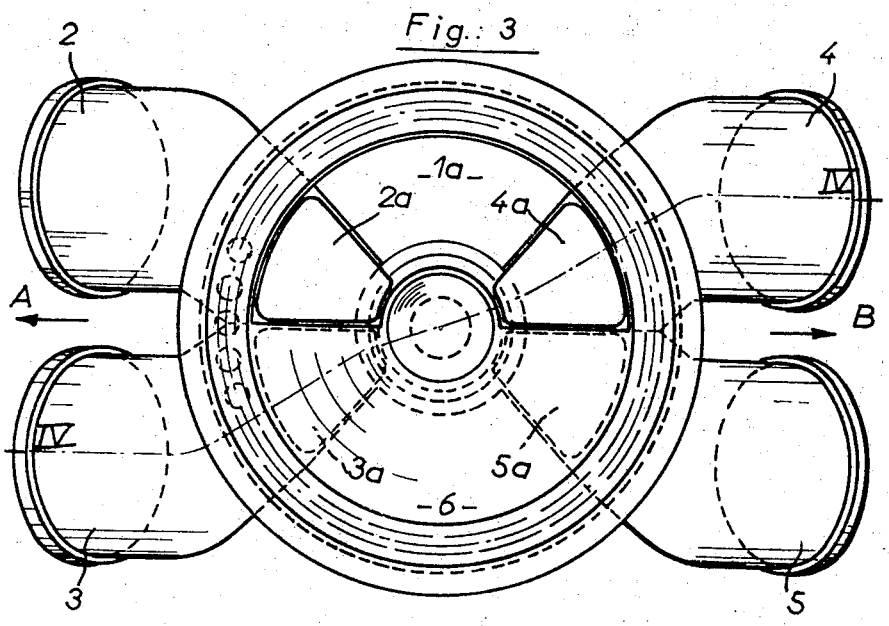
Fig.:3
INVENTOR
Etienne Y. J. M. Gire
By Watson, Cole, Grindle & Watson
ATTORNEYS

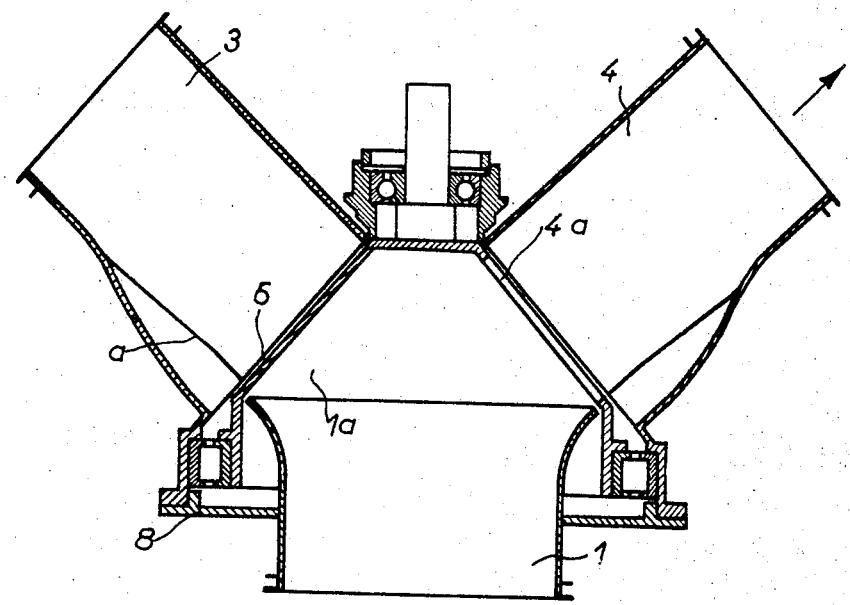
Fig.: 4
Fig.: 5
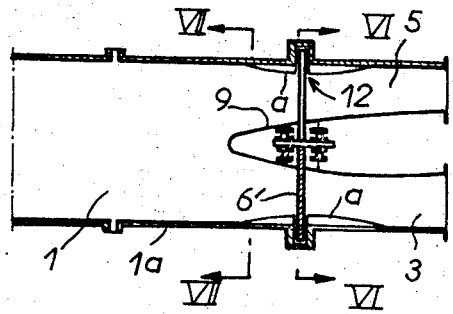
Fig.: 6
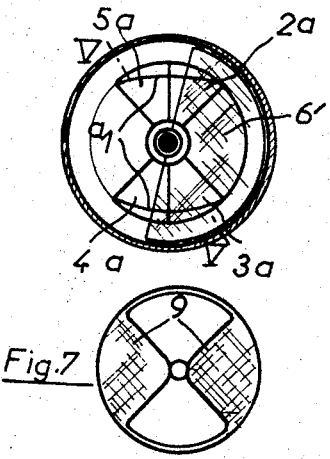
Fig. 7

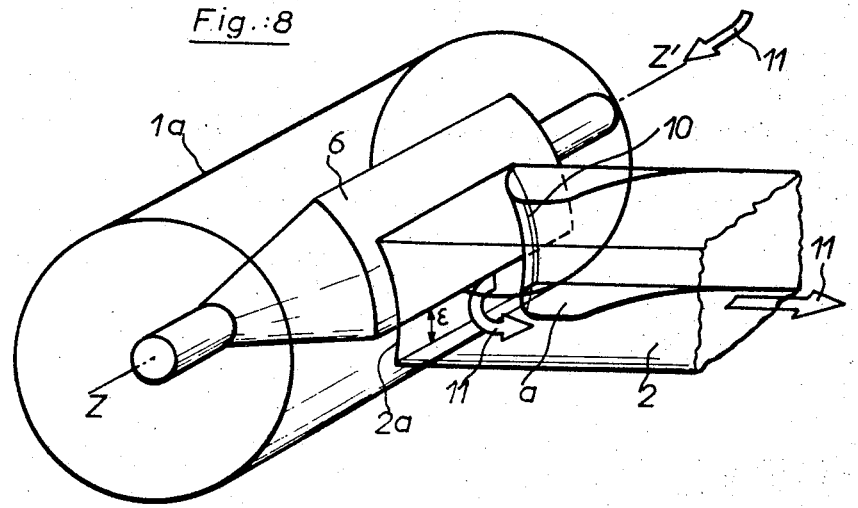
Fig.:8
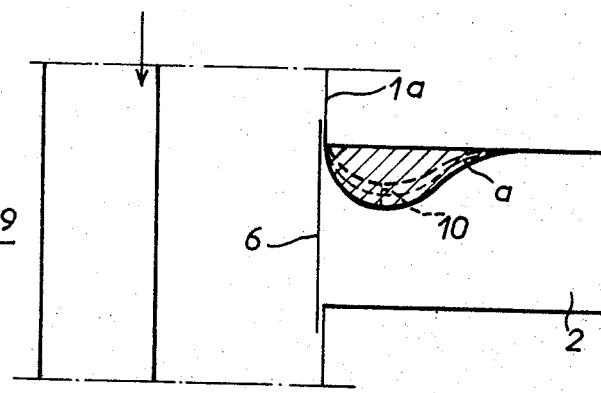
Fig.:9
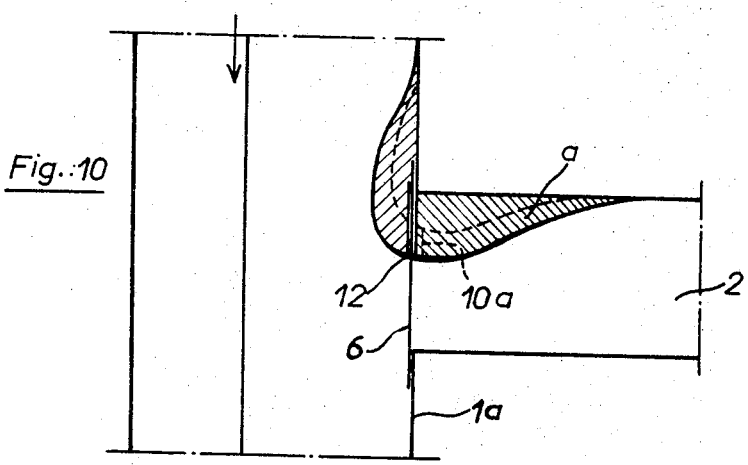
Fig.:10

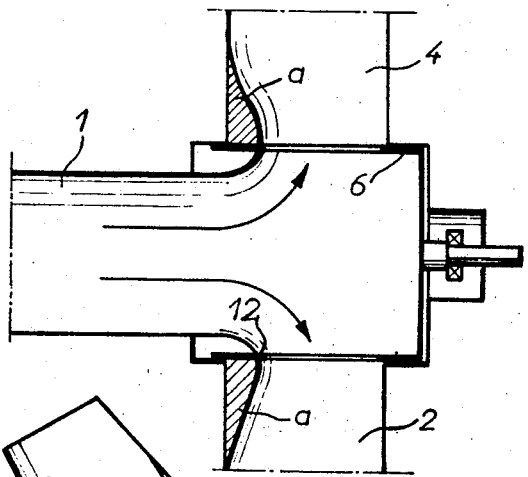
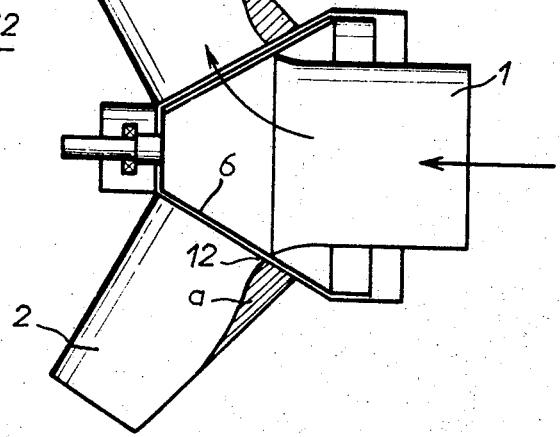
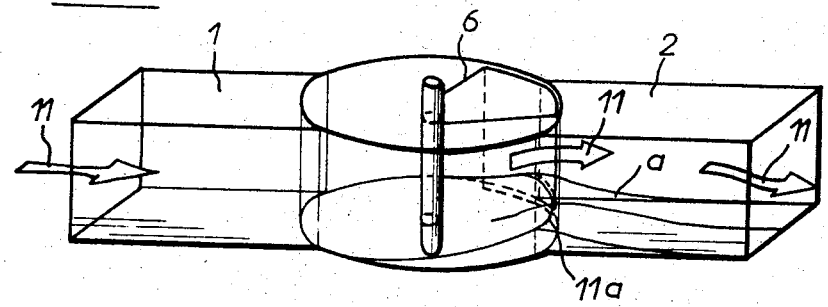

United States Patent Office 3,365,165
Patented Jan. 23, 1968

3,365,165
VALVE DEVICES
Etienne Yves Jean Marie Gire, Fontaine-le-Port, France, assignor to Societe Nationale d'Etude et de Construction de Moteurs d'Aviation, Paris, France, a company of France
Continuation-in-part of application Ser. No. 298,025, July 29, 1963. This application June 16, 1964, Ser. No. 375,544
Claims priority, application France, Aug. 2, 1962, 905,928
6 Claims. (Cl. 251—118)

This is a continuation-in-part of application Ser. No. 298,025 filed July 29, 1963, and now abanadoned.

The present invention relates to a valve device having at least one obturator member which is movable to control a flow of fluid outgoing through an outlet pipe. More particularly, this invention relates to such a valve device associated with means for operating the obturator member to control the flow rate of the outgoing fluid in accordance with a predetermined law.

An object of the invention is the provision of a valve device wherein such section areas are defined or induced for the outgoing fluid in the valve device by the movement of the obturator member, that the outgoing fluid flows correctly at a flow rate which is related to the movement of the obturator member by a desired or predetermined law.

Also, the invention relates to an apparatus for differentially distributing between at least two receiving members a fluid supplied by a source at a certain flow rate, of the type comprising in combination a valve device receiving the flow from the source and a plurality of groups of pipes arranged between the valve device and each of the receiving members, each group consisting of at least two respective pipes leading to a respective one of the receiving members, said valve device having in respect of each group of pipes an obturator adapted to cover or uncover the pipes of a same group, means for mutually associating all the obturators and means for simultaneously positioning said associated obturators anywhere between a mean position wherein the flow is equally divided between all the receiving members, at least one extreme position wherein the flow is conveyed to only one of the receiving members, and at least one intermediate position wherein the flow is unequally divided between said receiving members, said obturators being so shaped and associated to one another that in each of said positions at least one pipe is fully uncovered.

Such an apparatus is disclosed and fully described in U.S. Patent No. 3,190,584, and will be referred to in the specification and in the appending claims as apparatus of the mentioned type.

In a form of embodiment of the apparatus of the mentioned type, which is disclosed in the abovementioned patent, the obturators or closure members, which are operated by a single control, are different from one another and are spaced, for example, along the axis of the valve. In this form of embodiment, a valve with four outlets, for example, makes it possible, to transmit without valve losses towards each of two receiving members, for example two co-operating discharge nozzle assemblies of the control jets of a vertical take-off aircraft, either the maximum flow or half of the maximum flow of a source of fluid under pressure. In the intermediate positions of the valve, pressure losses are caused by the constriction of cross-section at the valve, but these are less than those which would be produced in a valve supplying each point of use by means of a single conduit.

For some applications of the apparatus of the mentioned type, specific characteristics can be required in the flow rates of fluid or the amounts of energy delivered to the receiving members, continuously and in all positions of the obturator means. For instance, if the apparatus is used to feed the control jets of a vertical take-off aircraft, it can be required that the total flow rate of the control jets be constant and the control moment of the same be linearly related to the movement of the obturator means.

Another object of the invention is the provision of an apparatus of the mentioned type wherein a desired or predetermined relation is achieved between the flow rates of fluid fed to each receiving member and the movement of the obturator means.

In accordance with the invention, correct cross-sections for the fluid flow are induced in the valve device or apparatus by the movement of the obturator means, by providing internal wall means which define a throat line in the outlet pipe or in each outlet pipe close to the obturator means. The throat line is so shaped and so connected to the walls of the valve device or apparatus, that a throat for the fluid flow is induced within said throat line of the wall means by the obturator means, the section area of which is related to the movement of the obturator means by the desired or predetermined law.

Preferably, the internal walls are formed both in a valve body of the valve device and in the outgoing pipe or pipes. Yet, correct cross-sections can be obtained by providing the internal walls in the outgoing pipe or pipes only. Also, it is possible to accommodate a valve of any type by providing internal walls in the outgoing pipe or pipes only, without altering the valve body internally.

The cross-section of the outgoing pipes will be commonly circular or rectangular but it can have another shape, such as elliptic, oval, etc. Of course, the internal wall must be shaped in consideration to the cross-section shape of the outgoing pipes, in order to perform the desired law of variation of the section area of the throat.

The valve devices of the invention will incorporate obturators of any type, such as slide-valves, rotatable plug valves, throttle- or butterfly-valves, etc., the only condition being that the outlet cross-section uncovered by the movable portion of the obturator of a valve must be adapted to be acted upon by a streamlined surface of the internal wall which will be provided inside the outgoing passage.

Further features and advantages of the invention will be apparent from the following description with reference to the accompanying drawings, wherein:

FIGURE 1 is a side view of a differential distribution valve, taken in section through the line I—I of FIGURE 2.

FIGURE 2 is an elevational view partly in section of the valve of FIGURE 1, showing an internal wall thereof.

FIGURE 3 is a view from below of a modified differential distribution valve, having a conical plug.

FIGURE 4 is a sectional view taken on the line IV—IV of FIGURE 3, showing internal walls.

FIGURE 5 shows another form of embodiment of a differential distribution valve, seen in longitudinal section.

FIGURES 6 and 7 are sectional views respectively on the lines VI—VI and VII—VII of FIGURE 5.

FIGURE 8 shows diagrammatically a valve provided with an internal wall according to the invention, seen in perspective.

FIGURE 9 is a diagrammatic view in longitudinal section of the valve shown in FIGURE 8.

FIGURE 10 is a view similar to FIGURE 9 showing a modification.

FIGURES 11 to 13 show various forms of embodiment of valves constructed according to the arrangement shown in FIGURE 10, seen in longitudinal section in FIGURES 11 and 12 and in diagrammatic perspective view in FIGURE 13.

FIGURE 14 shows diagramamtically a device for controlling a vertical take-off aircraft by jets, and FIGURE 15 is a diagram illustrating a method of calculating the shape of the internal wall of a valve device which is used for this control.

In the various figures, the elements or members which carry out like functions are designated by like reference numerals.

Referring to FIGURES 1 to 7, there is shown in FIGURES 1 and 2, in FIGURES 3 and 4, and in FIGURES 5 to 7, respectively, three different forms of embodiment of an apparatus of the mentioned type, which are fully described in the above-mentioned U.S. Patent No. 3,190,584, and therefore do not need to be fully described in the foregoing.

In the apparatus shown, an inlet conduit 1 connected to a source of fluid under pressure (not shown) terminates at one end of a valve body 1a. Branching from the valve body 1a are two pairs of pipes 2, 4 and 3, 5, each pair having a pipe 2 or 3 which leads to a first receiving member A, and a second pipe 4 or 5 which leads to a second receiving member B. Working in the valve body 1a is an obturator member 6 or 6' adapted to obturate and uncover the pipes selectively. The pipes have equal cross-section areas which are so sized that when, for example, the pipes 4, 5 are in communication with the conduit 1 whereas the pipes 2, 3 are obturated, the pipes 4, 5 which are in service can convey the entire flow delivered through the conduit 1.

The obturator member 6 or 6' is so related to the pairs of pipes 2, 4 and 3, 5 that:

(a) In a mean position thereof the obturator member uncovers equal passage areas of the pipes such as 3, 5 leading to the receiving members A, B, respectively,
(b) In an extreme position thereof the obturator member uncovers the pipes such as 2, 3 leading to one of the receiving members such as A, while fully obturating the other pipes, whereby only the said receiving member such as A is supplied with the whole flow of the source,
(c) In at least one position thereof intermediate the said mean and extreme positions, the obturator member uncovers unequal passage areas of the pipes such as 2, 3 and 5, leading to the receiving members, whereby the receiving members A, B are supplied with unequal flows of fluid,
(d) In any of the said three positions, at least one pipe such as 3 is fully uncovered.

It will be appreciated that the apparatus shown permits of differential supply to two receiving members with the minimum amount of loss caused by cross-sectional restriction in a distribution system, whilst ensuring that a reduction in the flow towards a receiving member causes an increase in the flow towards the other receiving member, the flow from the source thus remaining substantially constant. It can be seen in the drawing that in the above-mentioned mean and extreme positions the entire flow from the source is conveyed by the pipes without any cross-sectional restriction, whilst in the intermediate position of the obturator member, only a part of the flow is affected with cross-sectional restriction caused by the obturator member partly uncovering pipes such as 2 and 5.

In the form of embodiment of FIGURES 1 and 2, the valve comprises an axial inlet 1 and four ports such as 3a and 4a which are arranged in a circle along the periphery of the valve body 1a and to which are fitted four outgoing conduits 2, 3, 4, 5 terminating in pairs at the points of use A and B. The obturator member is a rotatable plug 6 which is rotated by an operating device 7 for closing or unmasking the four ports according to a desired law.

In the mean position illustrated in FIGURE 1, the points A and B receive an equal flow of fluid through the conduits 3 and 5, the conduits 2 and 4 being closed.

A suitable rotational movement of the plug 6 from this position in one or other direction permits of supplying a single side with the entire available flow. For example, if the plug 6 is rotated through a suitable angle in the clockwise direction, the conduits 4 and 5 are closed and all the flow flows towards the point A through the conduits 2 and 3.

According to the invention, each of the pipes 2, 3, 4, 5 is provided with an internal wall $a$ wherein a throat for the fluid flow is induced by the plug 6, the cross-section area of which varies with the position of the plug 6. The arrangement of wall $a$ will be described hereinafter with reference to FIGURE 8 and following figures.

In the valve shown in FIGURES 1 and 2, the valve body 1a and the plug 6 are cylindrical and the outgoing conduits have their axes in one and the same plane perpendicular to the axis Y–Y' of the valve. In the valves of this kind, it is also possible to incline the outgoing conduits relatively to the longitudinal axis, for the sole purpose of reducing the change in direction of the flow within the valve. But in this arrangement the cross-sections unmasked by the plug are no longer perpendicular to the mean direction of the flow, with the result that the variations in cross-section produced by the plug in the ports 3a or in the throat defined by the walls $a$ remain badly defined.

In order to overcome this disadvantage, it is possible to use a conical-plug valve such as that illustrated for example in FIGURES 3 and 4. FIGURE 3 is a view of the valve from below, the inlet 1 and the lower cover 8 being assumed to have been removed. FIGURE 4 is a sectional view on the cylindrical surface having as its directrix the axis IV—IV of the two conduits 3, 4, this sectional view being brought by rotation into the frontal plane of symmetry for the purpose of projection. In this arrangement, the valve body 1a and the plug 6 are frusto-conical so that the outgoing conduits 2, 3, 4, 5 are connected substantially along cross-sections, by means of internal walls $a$. The result is thus obtained that the cross-section of passage unmasked by the plug is perpendicular to the mean direction of flow. It will be seen in FIGURE 3 that the outgoing ports or orifices such as 4a are not circular but of trapezoidal form and are connected further downstream to conduits such as 4, having a circular cross-section.

The blind portion of the plug 6 is shown in FIGURE 3 and permits distribution without valve losses, as in the arrangement shown in FIGURE 1. In the position shown in the drawings, the ports 2a and 4a are uncovered. By rotating the plug in the appropriate direction, the ports 4a and 5a, then 3a and 5a, and finally 2a and 3a, are uncovered successively.

The form of embodiment of FIGURES 5, 6 and 7 differs from the preceding in that the closure member 6' is no longer a cylindrical or conical plug but is in the form of a sector of a circular disc. The four outgoing pipes 2, 3, 4, 5 are in prolongation of the axial inlet 1 and are connected to a valve body 1a by four ports 2a, 3a, 4a, 5a in the form of sectors. The closure member 6' which in the example illustrated is substantially semi-circular, successively closes in its rotational movement the pipes 2 and 3 and then 3 and 4, 4 and 5 and finally 5 and 2, thus permitting of differential supply to the two points of use as in the preceding examples.

It will be seen that in this form of embodiment the outgoing pipes are in prolongation of the inlet 1 and that consequently the valve does not change the direction of flow of the fluid but requires a considerable frontal inlet cross-section. The outgoing pipes 2, 3, 4, 5 have originally the form of sectors (FIGURE 6) and are connected downstream to circular conduits. Upstream of the closure member there are provided deflectors 9 (FIGURE 7) forming a wall along which the fluid flows in the valve, to avoid the discontinuity of the cross-sections of passage of the valve and permit progressive transformation from the circular section of the inlet 1 to the sector-shaped section opposite the closure member 6'.

There is provided an internal wall $a$ which is interrupted along a slot 12 for passage of the closure member 6' and extends from either sides of the slot in each outgoing pipe such as 3 and 5 and in the valve body 1$a$, respectively. The internal wall $a$ will define a throat for the fluid flowing in each outgoing pipe, the cross section of which varies with the movement of the closure member 6'.

It will be noticed that the cross sections of the valve body and outgoing pipes are evolutive along the axis of the valve, changing progressively from a circular shape upstream of deflectors 9 to the shape of four sectors in front of closure member 6', and therefrom to the shape of four circular conduits such as 3 and 5. Accordingly, the shape of the internal wall $a$ is not simple. The wall $a$ is seen in cross-section in FIGURE 6 wherein the throat line $a_1$ is shown. FIGURE 5 shows an axial section of the wall $a$.

Like the valves of the preceding figures, the valve of FIGURES 5 to 7 must distribute a constant flow of fluid entering the valve, differentially between a first receiving member which is fed by pipes 2 and 3, and a second receiving member which is fed by pipes 4 and 5. Accordingly, the flow rate of fluid which is conveyed through both pipes 2 and 3 will vary from zero to a maximum flow rate while the complementary flow rate of fluid through both pipes 4 and 5 varies from a maximum to zero. Therefore, the internal wall $a$ must be symmetrical with respect to the axis of rotation of closure member 6'.

It will be explained now, with reference to FIGURES 8 to 15, how the internal wall of the invention can be arranged in some particular types of valves, given by way of examples.

FIGURES 8 to 10 show two different arrangements of an inner wall $a$ which defines a throat line 10 in an outgoing pipe 2 from a port 2$a$ formed in a valve body 1$a$, in such a manner that the cross-section area of the throat which is induced for the fluid by the plug 6 varies with the position of the plug 6 of the valve. These FIGURES 8 to 10 can be considered as showing a valve body 1$a$ having but one outgoing pipe 2. It will be appreciated that FIGURES 8 to 10 can be considered, also, as partly illustrating, or partly diagrammatically showing a valve body 1$a$ having a number of outgoing pipes such as 2 and a number of internal walls such as $a$, like the valves of the preceding figures, and in this respect, FIGURES 11 and 12 show forms of embodiment of the arrangement of FIGURE 10.

FIGURE 8, FIGURE 9 which is a section view on FIGURE 8 on a plane passing through the axis Z-Z' of the valve and through the axis of the outgoing pipe 2, and FIGURE 10 which is a view similar to FIGURE 9 showing a modification, show diagrammatically an inner wall $a$ which defines a throat line 10 perpendicular to the flow in the pipe 2. Throat line 10, as shown, is close to the plug 6 in the outlet pipe 2. The plug 6 induces a throat for the fluid flowing through line 10 of the wall $a$, the section area of which varies with the position $\epsilon$ of the plug 6 in accordance with the desired law. The flow of fluid is shown diagrammatically by arrows 11.

In the flow direction, the wall $a$ is connected downstream to the conduit root so as to provide a good diffuser and upstream to the valve body 1$a$ level with the starting point of the pipe 2 in the case of FIGURES 8 and 9.

In the case of FIGURE 10, of which FIGURES 11, 12 and 13 show various forms of embodiment, the contour of wall $a$ is connected upstream to the interior of the valve body 1$a$. This latter arrangement has the advantage of situating the throat 10$a$ of the internal wall $a$ at the level of the closure member 6, in order to make it possible to control more satisfactorily the variations in cross-section produced by the throat-plug assembly.

Of course, in this case, the inner wall $a$ which projects to either side of the plug 6 will have to be interrupted along a slot 12 in order to permit the said plug to pass through.

The conduits such as 2 can be connected towards the downstream side to a circular cross-section by appropriate transition tubes.

Experience shows that the evolution of the cross-sections in accordance with the position of the plug has variations which are all the smaller in proportion as the level of speed through the throat is greater. Therefore, it will be advantageous to design the throat for a high speed, which will result in reducing the maximum dimension of the outlet ports 2$a$ axially to the plug 6, and consequently in reducing the bulk of the valve. In cases where it is possible to reach sonic speed, an additional advantage is obtained which is that the characteristics of the valve are made independent of the downstream installation.

The wall $a$ can be provided directly by curving the plates used for the construction of the valve (arm, valve body, etc.) or by fitting detachable parts into the interior.

The following example shows, with reference to FIGURES 14 and 15, how the calculations for determining the line 10 can be carried out. It will be understood, however, that the method of calculation indicated is not intended to limit the invention in any way.

In FIGURE 14, four control nozzles $A_2$, $A_3$, $B_4$, $B_5$, grouped in pairs, symmetrical for example with respect to the longitudinal axis of an aircraft and separated by a distance $l$, are supplied respectively through the conduits 2, 3 and 4, 5 from a valve 1$a$ of the mentioned type, having obturator means 6.

FIGURE 14 shows diagrammatically two different sections of a valve device having obturator means 6 which are operated to distribute the flow of a source of fluid under pressure between the four outgoing pipes 2, 3, 4, 5. The valve device can comprise two valve bodies, each valve body having an obturator member which works therein, and means for synchronously operating both obturator members. Or else, FIGURE 14 can show two different sections of a valve body 1$a$ having an elongated plug working therein, which has two different portions for obturating and uncovering the respective pairs of pipes 2, 4 and 3, 5. Alternatively, FIGURE 14 can be a diagrammatical view of any of the valves shown in FIGURES 1 to 13.

It must be understood that FIG. 14 is intended to illustrate the above mentioned method of calculation, whatever the form of embodiment of the valve and obturator 6 may be. The movement of the obturator 6 is assumed to be a rotation as $\epsilon$ in FIGURE 8, which causes a degree of opening in each outgoing pipe.

In the case where there is constancy of the flow rate of the fluid supplied by the source, and a general law relates the control moment M of the aircraft to the degree of opening $\epsilon$, the obturator 6 rotating in the sense of arrows 13 and starting from the position of FIGURE 14, the pertinent equations are as follows:

$$\frac{d3}{dm} + \frac{d4}{dm} = 1 \quad (1)$$

$$M = (fm + f2 - f4)\frac{l}{2} = Kf(\epsilon) \quad (2)$$

In these relations, $d2$, $d3$, $d4$, $d5$ and $dm$ are the flow rates in the conduits 2, 3, 4, 5 and the maximum flow, respectively; $f2$, $f3$, $f4$, $f5$ and $fm$ are the thrusts of the nozzles $A_2$, $A_3$, $B_4$, $B_5$ and the maximum thrust respectively.

Since the thrust of each nozzle is related to the flow rate in the tube leading to the said nozzle, and the said thrust is further related to $\epsilon$ by the relation (2), it will be apparent that the said thrust can be eliminated, resulting in an equation which satisfies the double condition required (constancy of the flow rate of fluid delivered by the source, and predetermined law relating the control moment to $\epsilon$). This equation relates the flow rate $dp$ through the said pipe to the aperture of the said pipe, which is defined by the obturator, and this equation is of the form:

$$\frac{dp}{dm} = \varphi(\epsilon)$$

wherein $\varphi(\epsilon)$ is a function of $\epsilon$.

Thus the passage cross-section area $s$ is determined as a function of the aperture $\epsilon$, to within a constant, by $$s = s_m \varphi(\epsilon)$$

wherein $s_m$ is the value of $s$ corresponding to the position of the obturator, in which the obturator fully uncovers the said pipe.

The equation for the curve of evolution $y(\epsilon)$ of the profile of the aperture can be obtained from the relation:

$$\int_0^{\epsilon_m} y(\epsilon) d\epsilon = s_m \varphi(\epsilon)$$

wherein $\epsilon_m$ is the maximum aperture, and $d\epsilon$ is the differential coefficient of $\epsilon$.

The equation for $y(\epsilon)$, which is derived from this relation, is of the form:

$$y(\epsilon) = s_m \varphi'(\epsilon)$$

wherein $\varphi'(\epsilon)$ is a function of $\epsilon$.

It will be apparent that the method of calculation hereinbefore disclosed will permit to calculate $y(\epsilon)$ as a function of $\epsilon$ for satisfying to the above-mentioned conditions.

Considering, for instance, that the pipe 2 which leads to the nozzle $A_2$ is the pipe 2 of FIGURE 8, $y(\epsilon)$ will be the abscissa of each point of the curve 10, taken axially of the plug 6, corresponding to the aperture $\epsilon$ of the said plug. In other words, $y(\epsilon)$ is the equation of curve 10, the abscissae thereof being taken axially along the plug 6, and the aperture $\epsilon$ of the plug 6 being taken in the direction of the displacement thereof.

FIGURE 15 gives the pattern of this curve.

What is claimed is:

1. In a valve device comprising a valve body having at least one outlet port, an outlet pipe projecting from the port and cooperating with the body to define an outlet duct for a fluid fed to the valve device, and an obturator member having an edge movable along opposite sides of the port to cover and uncover the same whereby to control the flow rate of the fluid in the duct, the improvement comprising internal wall means in the duct, which define a restriction close to the port in the pipe along a throat line extending generally in the direction of movement of said edge and form a surface joining the throat line to the inner surface of the duct upstream and downstream of the throat line, whereby a throat is formed in the pipe, in register with the portion of the port which is uncovered by the obturator member, and is limited by the said line laterally to the said direction.

2. A valve device as claimed in claim 1, wherein the internal wall means extend within the valve body to be joined with the inner surface thereof, comprising a slot in the said wall means for passage therethrough of the obturator member.

3. A valve device as claimed in claim 1, wherein the outlet pipe comprises at least one substantially plane wall projecting from a corresponding one of said opposite sides of the port, the internal wall means cover a portion of said substantially plane wall adjoining the said one side, and the throat line is an arcuate line extending generally along said one side.

4. A valve device as claimed in claim 1, wherein the outlet port is a sector shaped port having arcuate inner and outer sides, the obturator member comprises a sector shaped blind section of a circular disc which is rotatable in the body with the said edge moving along said inner and outer sides, and the internal wall means cover a portion of wall of the pipe adjoining said outer side, with the throat line extending generally along said outer side.

5. A valve device as claimed in claim 1, forming part of an apparatus of the mentioned type, comprising a number of outlet ports each associated with a respective outlet duct and respective internal wall means.

6. A valve device comprising a valve body, at least one outlet port in the body and an outlet pipe projecting from the port to define an outlet duct comprising portions of inner surfaces of the body and pipe adjacent the port; an obturator member having an edge movable along at least one side of the port to cover and uncover the port; and internal wall means within the duct, which cover a portion of the duct extending along said side to define a restriction close to the port in the pipe along a throat line extending generally along said side, the internal wall means forming a surface which joins the throat line to the duct upstream and downstream of the throat line.

References Cited
UNITED STATES PATENTS

| | | | |
|---|---|---|---|
| 850,762 | 4/1907 | Kolla | 137—610 |
| 1,725,337 | 8/1929 | Burkhard | 137—608 |
| 2,590,797 | 3/1952 | Siciliano | 138—39 |
| 2,921,435 | 1/1960 | Landgraf | 60—35.54 |
| 2,995,894 | 8/1961 | Baxter et al. | 60—35.54 |
| 3,076,480 | 2/1963 | Vicord | 138—39 |
| 2,357,341 | 9/1944 | Miner | 251—124 |
| 2,492,151 | 12/1949 | Holm | 137—625.11 |
| 2,747,831 | 5/1956 | Van Deventer | 251—124 |
| 2,920,858 | 1/1960 | Hunter | 251—118 |
| 3,206,926 | 9/1965 | Lockwood | 137—625.11 |

M. CARY NELSON, *Primary Examiner.*

W. CLINE, *Assistant Examiner.*